United States Patent
Sun

(10) Patent No.: US 11,160,131 B2
(45) Date of Patent: Oct. 26, 2021

(54) METHOD, NETWORK DEVICE AND TERMINAL DEVICE IN A BEAM-BASED MMWAVE COMMUNICATION SYSTEM

(71) Applicant: Alcatel Lucent, Nozay (FR)

(72) Inventor: Huan Sun, Shanghai (CN)

(73) Assignee: Alcatel Lucent, Nozay (FR)

( * ) Notice: Subject to any disclaimer, the term of this patent is extended or adjusted under 35 U.S.C. 154(b) by 208 days.

(21) Appl. No.: 16/306,370

(22) PCT Filed: May 17, 2017

(86) PCT No.: PCT/IB2017/000752
§ 371 (c)(1),
(2) Date: Nov. 30, 2018

(87) PCT Pub. No.: WO2017/208071
PCT Pub. Date: Dec. 7, 2017

(65) Prior Publication Data
US 2020/0328779 A1   Oct. 15, 2020

(30) Foreign Application Priority Data

May 31, 2016   (CN) .......................... 201610375044.1

(51) Int. Cl.
*H04B 7/0426* (2017.01)
*H04W 8/02* (2009.01)
(Continued)

(52) U.S. Cl.
CPC ............ *H04W 76/19* (2018.02); *H04B 7/043* (2013.01); *H04W 8/02* (2013.01); *H04W 72/04* (2013.01); *H04W 72/046* (2013.01)

(58) Field of Classification Search
None
See application file for complete search history.

(56) References Cited

U.S. PATENT DOCUMENTS

| 2013/0083774 A1 | 4/2013 | Son et al. |
| 2013/0121185 A1* | 5/2013 | Li ..................... H04W 24/10 370/252 |

(Continued)

FOREIGN PATENT DOCUMENTS

| CN | 103988551 A | 8/2014 |
| CN | 105556869 A | 5/2016 |

(Continued)

OTHER PUBLICATIONS

Sun Nak Woon et al. "Fast intra-beam switching scheme using common contention channels in millimeter-wave based cellular systems", 2016 18th International Conference on Advanced Communication Technology (ICACT), Global IT Research Institute (GIRI, Jan. 31, 2016 (Jan. 31, 2016), pp. 760-765.

(Continued)

*Primary Examiner* — Kenny S Lin
(74) *Attorney, Agent, or Firm* — Fay Sharpe LLP

(57) ABSTRACT

The present disclosure provides a method, network device and terminal device for mobility management in a beam-based millimeter wave communication system. In one embodiment of the present disclosure, there is provided a method for mobility management implemented by a network device in a beam-based millimeter wave communication system. The method comprises: receiving, from a terminal device, a request for mobility management; allocating dedicated resources for transmitting a beam switching request in response to the request for the mobility management; transmitting a first indication of the allocated dedicated resources to a terminal device; and receiving, from the terminal device, the beam switching request over the dedicated resources, the beam switching request indicating a target beam to which the terminal device is to be switched.

15 Claims, 7 Drawing Sheets

(51) Int. Cl.
  *H04W 72/04* (2009.01)
  *H04W 76/19* (2018.01)

(56) References Cited

U.S. PATENT DOCUMENTS

| | | | |
|---|---|---|---|
| 2013/0155847 A1* | 6/2013 | Li | H04W 76/10 370/225 |
| 2015/0004918 A1 | 1/2015 | Wang et al. | |
| 2016/0183234 A1* | 6/2016 | Sung | H04W 72/046 370/329 |
| 2018/0123675 A1 | 5/2018 | Shi et al. | |

FOREIGN PATENT DOCUMENTS

| | | |
|---|---|---|
| KR | 2013-0034827 A | 4/2013 |
| WO | WO 2013/058673 A1 | 4/2013 |

OTHER PUBLICATIONS

Gao Bo et al., "Double-link beam tracking against human blockage and device mobility for 60-GHz WLAN", 2014 IEEE Wireless Communications and Networking Conference (WCNC), IEEE, Apr. 6, 2014 (Apr. 6, 2014), pp. 323-328.

Tang Suhua et al., "Optimization of Frame Length Modulation-Based Wake-Up Control for Green WLANs", IEEE Transactions on Vehicular Technology, IEEE Service Center, Piscataway, NJ, US, vol. 64, No. 2, Feb. 2015 (Feb. 1, 2015), pp. 768-780.

Min Cao et al, "Cross-Layer Exploitation of MAC Layer Diversity in Wireless Networks", Network Protocols, 2006, ICNP '06, Proceedings of the 2006 14$^{th}$ IEEE International Conference on, IEEE, PI, Nov. 1, 2006 (Nov. 1, 2006), pp. 332-341.

International Serach Report fo PCT/IB2017/000752 dated Sep. 5, 2017.

\* cited by examiner

METHOD, NETWORK DEVICE AND TERMINAL DEVICE IN A BEAM-BASED MMWAVE COMMUNICATION SYSTEM

FIELD

The present disclosure generally relates to the field of wireless communications, and more specifically, to a method, network device and terminal device in a beam-based millimeter wave communication system.

BACKGROUND

Millimeter wave communication (MMC) is regarded as a key technique in 5G radio network because it can for example provide available huge bandwidth to support over 10 Gbps data transmission. However, in a millimeter wave band, a radio wave faces a severe challenge on its propagation channel quality. As the radio wave has a smaller wavelength, a massive antenna array can be flexibly realized on the millimeter wave band with an acceptable size. Based on the massive antenna array, beam-forming technologies can be used to fight against the severe propagation loss, improve the channel quality and enhance the system performance.

Millimeter wave MIMO system (which perfectly integrates millimeter wave system with massive MIMO technology), has been extensively investigated on various aspects, such as hybrid analog/digital beam-forming design, reference sequence design, to help user equipment (UE) to get channel station information (CSI) and further data demodulation. As the large-scale antenna array is used in millimeter wave system, more accurate CSI is needed at the transmitter side to design the hybrid beam-forming design for random access and data transmission for UE. Besides, time division duplex (TDD) systems have higher priority to be firstly deployed in 5G networks. In TDD system, channel reciprocity between downlink channel and uplink channel can be exploited to get accurate CSI to support the hybrid beam-forming design and multi-UE scheduling and resource allocations.

In the TDD millimeter wave massive MIMO system, hybrid beam-forming is designed to support access and data transmission for UE. Hybrid beam-forming includes analog beam-forming in radio frequency side by a phase shifter and digital beam-forming in baseband. Analog beam is used to improve the whole bandwidth and enhance the channel quality and belongs to wideband beam-forming. However, digital beam is used for data transmission, and may be changed in different frequency resources. Digital beam belongs to narrowband beam-forming. For enlarging the cell coverage and simplifying the hybrid beam-forming procedures for millimeter wave massive MIMO cell, a beam-based millimeter wave cellular system is proposed.

In a beam-based millimeter wave cell, an analog beamformer is predetermined and can be changed with long period. Within one millimeter wave cell, each analog beam has a unified beam index. It means that one millimeter wave cell is divided into multiple partitions corresponding to analog beams, and each beam multiplexes the same system resource. The beam-based millimeter wave cell can provide huge capacity to support dense transmission for UE. However, this system is originally designed for static UEs or UEs with low velocity within the coverage of the cell. Each beam has a narrow coverage, and fast-moving UEs will cross multiple beams within a short period. Therefore, a mobility management solution is needed to support beam switching.

SUMMARY

To solve the above and other potential problems, embodiments of the present disclosure propose a method for mobility management in a beam-based millimeter wave communication system and a corresponding network device and terminal device.

In a first aspect of the present disclosure, there is provided a method for mobility management implemented by a network device in a beam-based millimeter wave communication system. The method comprises: receiving, from a terminal device, a request for the mobility management; allocating dedicated resources for transmitting a beam switching request in response to the request for the mobility management; transmitting a first indication of the allocated dedicated resources to the terminal device; and receiving, from the terminal device, the beam switching request over the dedicated resources, the beam switching request indicating a target beam to which the terminal device is to be switched.

According to one embodiment of the present disclosure, the method further comprises: broadcasting a second indication that indicates whether the network device supports the mobility management.

According to one embodiment of the present disclosure, the broadcasting a second indication comprises: broadcasting the second indication in a master information block over a physical broadcast channel, the second indication occupying one bit in the master information block.

According to one embodiment of the present disclosure, the allocating dedicated resources comprises: allocating the dedicated resources based on the number of requests for the mobility management.

According to one embodiment of the present disclosure, allocating the dedicated resources based on the number of terminal devices that transmit the requests for the mobility management comprises: allocating at least part of time-frequency resources of special sub-frames as the dedicated resources if the number of the terminal devices that transmit the requests for the mobility management is below a predetermined threshold within a first predetermined time period; and allocating at least part of time-frequency resources of normal sub-frames as the dedicated resources if the number of the terminal devices that transmit the requests for the mobility management is above the predetermined threshold within the first predetermined time period.

According to one embodiment of the present disclosure, allocating dedicated resources comprises: allocating the same dedicated resources to all beams in the beam-based millimeter wave communication system.

According to one embodiment of the present disclosure, allocating dedicated resources comprises: allocating different dedicated resources to respective beams in the beam-based millimeter wave communication system.

According to one embodiment of the present disclosure, allocating different dedicates resources to the respective beams in the beam-based millimeter wave communication system comprises: allocating dedicated resources that are different in at least one of a time domain and a frequency domain to the respective beams in the beam-based millimeter wave communication system.

According to one embodiment of the present disclosure, allocating the dedicated resources comprises: allocating the dedicated resources specific to the terminal device.

According to one embodiment of the present disclosure, the method further comprises: transmitting an acknowledge message to the terminal device in response to the beam switching request.

According to one embodiment of the present disclosure, transmitting the acknowledge message to the terminal device comprises: transmitting the acknowledge message to the terminal device via at least one of a serving beam of the terminal device and the target beam.

According to one embodiment of the present disclosure, the method further comprises: communicating with the terminal device via the target beam.

In a second aspect of the present disclosure, there is provided a method for mobility management implemented by a terminal device in a beam-based millimeter wave communication system. The method comprises: transmitting a request for the mobility management to a network device; receiving, from the network device, a first indication of dedicated resources for transmitting a beam switching request; determining whether a beam switching is to be implemented; and in response to determining that the beam switching is to be implemented, transmitting the beam switching request to the network device over the dedicated resources to indicate a target beam to which the terminal device is to be switched.

According to one embodiment of the present disclosure, the method further comprises monitoring transmission qualities of a group of beams, the group of beams including a serving beam of the terminal device and at least one neighboring beam; and determining whether the beam switching is to be implemented comprises: if a transmission quality of one of the at least one neighboring beam is higher than that of the serving beam within a second predetermined time period, determining the one of the at least one neighboring beam as the target beam, and determining that the beam switching is to be implemented.

According to one embodiment of the present disclosure, determining whether the beam switching is to be implemented comprises: if dynamic blockage or static blockage occurs, determining a neighboring beam of the terminal device as the target beam, and determining that the beam switching is to be implemented.

According to one embodiment of the present disclosure, the method further comprises: receiving, from the network device, a second indication that indicates whether the network device supports the mobility management; and wherein transmitting the request for the mobility management to the network device comprises: transmitting the request for the mobility management to the network device in response to the second indication indicating that the network device supports the mobility management.

According to one embodiment of the present disclosure, transmitting a beam switching request to a network device on dedicated resources comprises: transmitting the beam switching request to the network device by contending dedicated resources of a serving beam of the UE with other UEs in the serving beam.

According to one embodiment of the present disclosure, transmitting a beam switching request to a network device on dedicated resources comprises: transmitting the beam switching request to the network device by contending dedicated resources of the target beam with other UEs in the target beam.

According to one embodiment of the present disclosure, the method further comprises: receiving an acknowledge message from the network device; and in response to the acknowledge message, switching to the target beam and communicating with the network device via the target beam.

According to one embodiment of the present disclosure, the method further comprises: in response to failing to receive an acknowledge message from the network device within a third predetermined time period, determining at least one of a contention cycle, a contention strategy and a contention abandonment.

According to one embodiment of the present disclosure, receiving the acknowledge message from the network device comprises: receiving the acknowledge message from the network device via at least one of a serving beam of the terminal device and the target beam.

According to one embodiment of the present disclosure, transmitting the request for the mobility management to the network device comprises: transmitting the request for the mobility management to the network device upon accessing to the network device.

In a third aspect of the present disclosure, there is provided a network device. The network device comprises: a processor; and a memory including instructions executable by the processor, the processor being configured to cause the network device to perform the method according to the first aspect of the present disclosure.

In a fourth aspect of the present disclosure, there is provided terminal device. The terminal device comprises: a processor; and a memory including instructions executable by the processor, the processor being configured to cause the network device to perform the method according to the second aspect of the present disclosure.

It will be appreciated that, through the below description, the mobility management solution according to the present disclosure can support high-speed users in the beam-based millimeter wave communication system. Therefore, utilizing a central mobility management can simultaneously serve static terminal devices (e.g., 5G terminal devices) and high-speed terminal devices (e.g., 5G terminal devices) in the beam-based millimeter wave cellular system. The corresponding advantages will be described in the following text.

BRIEF DESCRIPTION OF THE DRAWINGS

Through the following detailed description with reference to the accompanying drawings, the understanding of the present disclosure will be more thorough and other objectives, details, features, and advantages of the present disclosure will become more apparent. In the drawings.

DETAILED DESCRIPTION OF EMBODIMENTS

Figure 1:
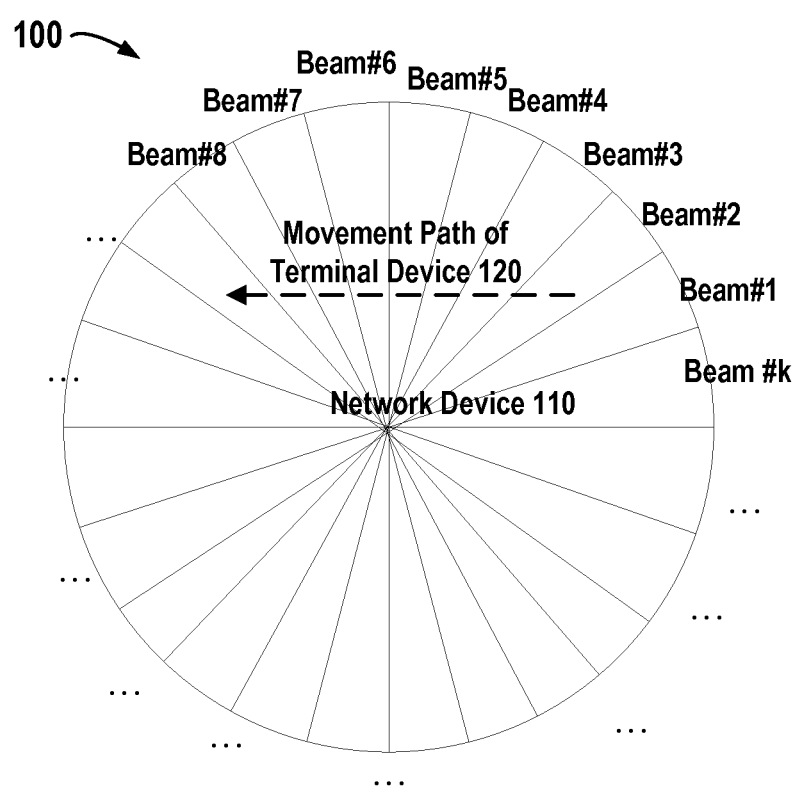
FIG. 1 is a scene graph of a beam-based millimeter wave communication system 100 according to one embodiment of the present disclosure.

Embodiments of the present disclosure will be described in details with reference to the drawings. Although the drawings illustrate some embodiments of the present disclosure, it should be appreciated that the present disclosure can be implemented in various manners and should not be limited to the embodiments described herein. On the contrary, those embodiments are presented for a more thorough and complete understanding of the present disclosure and to fully convey the scope of the present disclosure to those skilled in the art.

As stated above, a mobility management solution is needed to support beam switching in a beam-based millimeter wave cellular system. The inventor has noticed many drawbacks in the traditional solution. First of all, the waiting time is too long. Active terminal device in the beam monitors the serving beam quality and neighboring beam quality according to cell-level RRC configuration. Meantime, the terminal device also monitors a PDCCH by binding decoding to get information of the PDCCH on allocated resources for use in uplink transmission. If the PDCCH is successfully decoded and uplink resource information is got, the terminal device feeds back a measurement report to a network device (e.g., an eNB) and waits for beam switching decision from the network device. If the PDCCH decoding fails, the terminal device needs to wait for feedback until successfully decoding the PDCCH and getting the uplink transmission resource. No matter a mode of the measurement report is periodic or aperiodic, one predetermined time slot and resource can be used for the feedback of the measurement report on a PUSCH. Furthermore, beam switching is decided by the network device, and it is unaware to the terminal device before getting the feedback from the network device. Here, the ambiguous and lengthy time period for beam switching decision will impact the performance of fast-moving terminal devices, and the success or failure of decoding and the uncertainty of feedback will prolong the time for the beam switching.

Additionally, there is huge overhead in system uplink. The traditional solution is optimized to large coverage system. However, in a millimeter wave system, small coverage, more terminal devices and high frequency feedback will increase the uplink overhead, and degrade the system transmission efficiency. Further, there is static or dynamic blockage. In a millimeter wave massive MIMO cell, both the static blockage and the dynamic blockage should be considered seriously. When the moving terminal device is blocked temporally by the static blockage or the dynamic blockage, its channel quality will be degraded quickly, and the connection with the cell may even be lost in the worst condition. In this case, the terminal device will take a long time to rebuild the link with the cell/beam to receive a RRC signaling from the network device and performing CSI measurement report feedback. Thus, a long time is needed before the beam switching.

It is seen that the traditional solution is network device-centric, i.e., an network device decides whether a beam switching is needed and when to start the beam switching and notify the terminal device and a large amount of terminal device feedbacks and a longer decision delay time are needed.

Therefore, all those cases show that the traditional network device-centric solution is not suitable for the beam-based millimeter wave cellular system, especially not suitable for the situation in which high-speed terminal device requires a beam switching in the beam-based millimeter wave cellular system. Accordingly, it is required to design a more efficient mobility management solution for the beam-based millimeter wave system to support both static terminal devices and fast-moving terminal devices.

FIG. 1 shows a scene graph of a beam-based millimeter wave communication system 100 according to one embodiment of the present disclosure. As shown in FIG. 1, a cell managed by a network device (e.g., an eNB) 110 is divided into K partitions corresponding to K beams (beam #1, beam #2 . . . beam #k), wherein K is a natural number greater than 1. Each of the K beams respectively covers a corresponding partition to provide communication service of terminal devices within the partition. Such beam-based millimeter wave cell can provide huge capacity to support intensive terminal device transmission. Furthermore, as illustrated in FIG. 1, a terminal device 120 is rapidly passing through the cell so as to go through a plurality of beams within a short time period, which consequently causes a beam switching issue. As beams of the beam-based millimeter wave communication system have narrow coverage, the beam switching issue is further aggravated. Therefore, a mobility solution is needed to support high-speed terminal devices for beam switching. Here, instead of the network device-centric solution, the present disclosure proposes a terminal device-centric solution, i.e., a terminal device itself will autonomously decide whether a beam switching operation is initiated.

Figure 2:
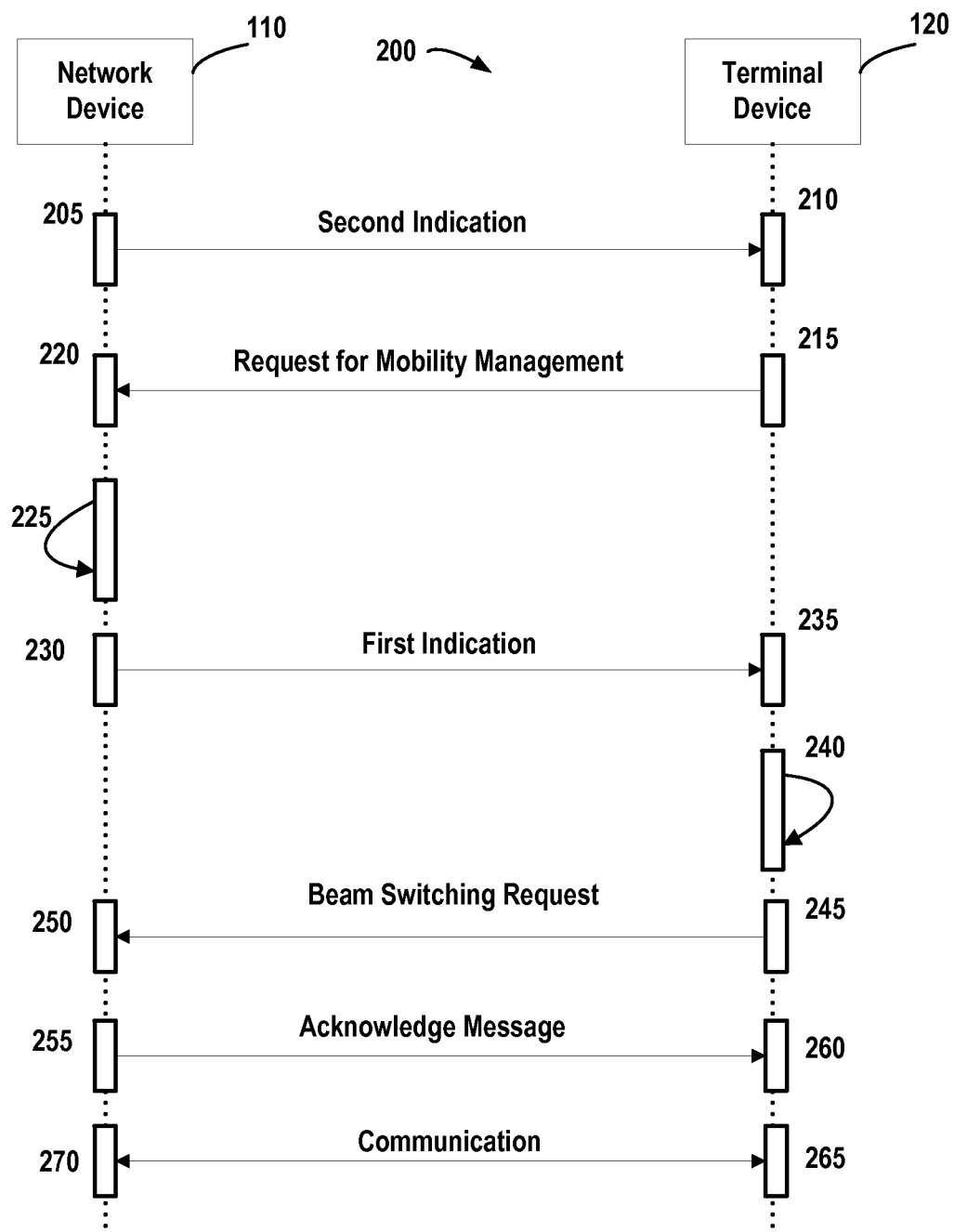
FIG. 2 shows a flow chart of a method 200 for mobility management in a beam-based millimeter wave communication system according to one embodiment of the present disclosure.

FIG. 2 shows a flow chart of a method 200 for mobility management in a beam-based millimeter wave communication system according to one embodiment of the present disclosure. The following text will describe the flow chart of the method 200 with reference to FIG. 1. The network devices and terminal devices in the communication system can cooperate with each other to implement method 200, so as to realize various embodiments of the present disclosure. For example, a network device is the network device (e.g., base station) 100 in FIG. 1 and a terminal device is the terminal device (e.g., UE) 120 in FIG. 1. It should be noted that examples in which an network device serves as the network device will be mainly described in the context of the present disclosure. However, it should be understood that this is only for the convenience of discussion and bears no intention to limit the scope of the present disclosure in any regard. Any currently known or to be developed network devices still have the possibility of being used in combination with the embodiments of the present disclosure.

With reference to FIG. 2, the network device 110 broadcasts (205) a second indication indicating whether the network device 110 supports the mobility management, to facilitate the terminal device 120 to receive (210) the second indication. In one embodiment of the present disclosure, the second indication indicates whether the network device 110 supports the terminal device-centric mobility management according to the present disclosure.

In some embodiments, it can be implemented through enhanced principle system information. Specifically, the network device 110 broadcasts the second indication in a master information block (MIB) over a physical broadcast channel (PBCH), the second indication occupying one bit in the MIB. The one bit is transmitted to all terminal devices in PBCHs of all beams, which belongs to cell level signaling. It should be appreciated that occupying one bit in a MIB is just exemplary and any other suitable signaling and bit numbers are possible.

By using this one bit, it can inform the terminal device whether the system supports the terminal device-centric mobility management solution. For instance, in one embodiment, if the new bit is set to one, it will indicate that the system/cell supports the terminal device-centric mobility management solution. If the new bit is set to zero, the terminal device is informed that the system/cell does not support the terminal device-centric mobility management solution.

Alternatively, in some other embodiments, if the new bit is set to one, it indicates that the system/cell supports both the terminal device-centric mobility management solution and the network device-centric mobility management solution at the same time. If the new bit is set to zero, the terminal device is informed that the system/cell supports the traditional mobility management solution, i.e., supports the network device-centric mobility management solution only.

Subsequently, the terminal device 120 transmits (215) a request for mobility management to the network device in response that the second indication indicating that the network device supports the mobility management. The request is used to apply to the network device 110 for a permission to access the terminal device-centric mobility management, so as to indicate that the terminal device 120 later may implement the terminal device-centric mobility management for beam switching. In some embodiments, the terminal device 120 transmits (215) the request for the mobility management to the network device upon accessing to the network device/cell. That is, if the terminal device 120 detects the received (210) second indication indicating that the system supports the terminal device-centric mobility management, the terminal device 120 will transmits (215) the request for the mobility management to the network device 120 upon accessing to the network successfully.

The network device 110 receives (220) the request and allocates (225) dedicated resources for transmitting a beam switching request in response to the request. Besides, the network device 110 will determine the resource allocation on cell level rather on beam level. Here, the network device 110 will respectively allocate dedicated resources for beam #1 to beam #k in FIG. 1.

In some embodiments, the network device 110 allocates dedicated resources based on the number of terminal devices that transmit requests for mobility management. Specifically, if the number of terminal devices that transmit the requests is below a predetermined threshold within a first predetermined time period, allocate at least a part of time-frequency resources of special sub-frames as dedicated resources; and if the number of terminal devices that transmit the requests is above a predetermined threshold within the first predetermined time period, allocate at least a part of time-frequency resources of normal sub-frames as dedicated resources. The network device 110 will obtain requests from all terminal devices that apply for the terminal device-centric mobility management. Here, the network device evaluates the necessary resources for supporting a beam switching, for example, based on the number of terminal devices that initiate the requests within a time period. If the number of terminal devices that initiate the requests is below the threshold, time-frequency resources of special sub-frames in TDD system will be preferably used as they do not affect data transmission. If the number of terminal devices that initiate the requests is above the threshold, time-frequency resources in normal sub-frames will be considered.

Figure 3:
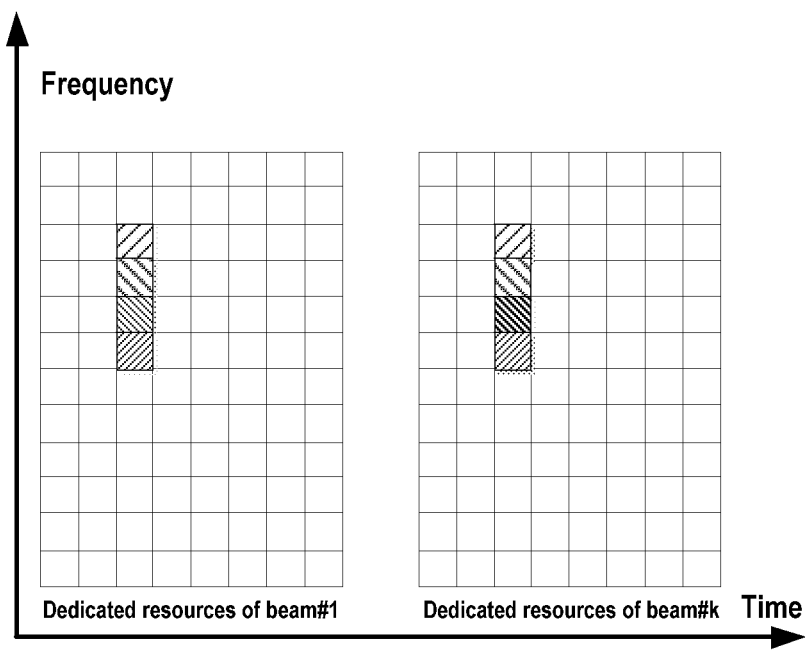
FIG. 3 is a schematic diagram of dedicated resource allocation according to one embodiment of the present disclosure.

In some embodiments, allocate the same dedicated resources for all beams in the beam-based millimeter wave communication system. With reference to FIG. 1, the same dedicated resources are allocated for beam #1 to beam #k. This solution is easy to implement. Here, all beams in the cell will use the same system resources. Take time-frequency resources of special sub-frames as an example, all beams in the cell will use the same time-frequency resources of special sub-frames. FIG. 3 shows a schematic diagram of dedicated resource allocation according to one embodiment of the present disclosure. In the example of FIG. 3, same dedicated resources are allocated for beam #1 to beam #k. FIG. 3 only illustratively shows the dedicated resources of beam #1 and beam #k for clarity. In FIG. 3, each block represents a unit of time-frequency resource, e.g., resource element (RE) and FIG. 3 illustratively allocates four resource elements (indicated by diagonal in FIG. 3) to each beam. However, it should be understood that any other number of resource elements are still possible. As shown in FIG. 3, the dedicated resources allocated to beam #1 and beam #k have the same position.

In some embodiments, different dedicated resources are allocated to each beam in the beam-based millimeter communication system. For example, different dedicated resources are allocated for beam #1 to beam #k in FIG. 1. By allocating different dedicated resources to different beams, the beam switching performance is optimized and the potential collisions among beams are avoided. In some embodiments, dedicated resources different in at least one of time domain and frequency domain are allocated to respective beams in the beam-based millimeter wave communication system. In some embodiments, the dedicated resources of respective beams are staggered in either time domain or frequency domain, or in both.

Figure 4:
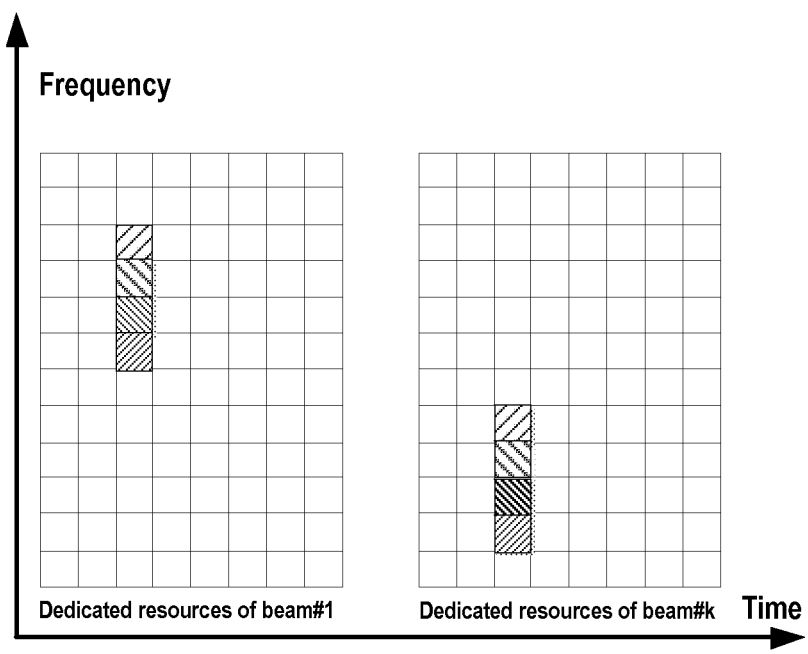
FIG. 4 is a schematic diagram of dedicated resource allocation according to another embodiment of the present disclosure.

FIG. 4 shows a schematic diagram of dedicated resource allocation according to another embodiment of the present disclosure. In this embodiment, the dedicated resources of respective beams are staggered in frequency domain. Similar to FIG. 3, FIG. 4 only illustratively shows the dedicated resources of beam #1 and beam #k for clarity. Likewise, in FIG. 4, each block represents a unit of time-frequency resource, e.g., resource element (RE) and FIG. 4 illustratively allocates four resource elements (indicated by diagonal in FIG. 4) to each beam. However, it should be understood that any other number of resource elements are still possible. As shown in FIG. 4, the dedicated resources allocated to beam #1 and beam #k have different positions and are staggered in frequency domain.

Figure 5:
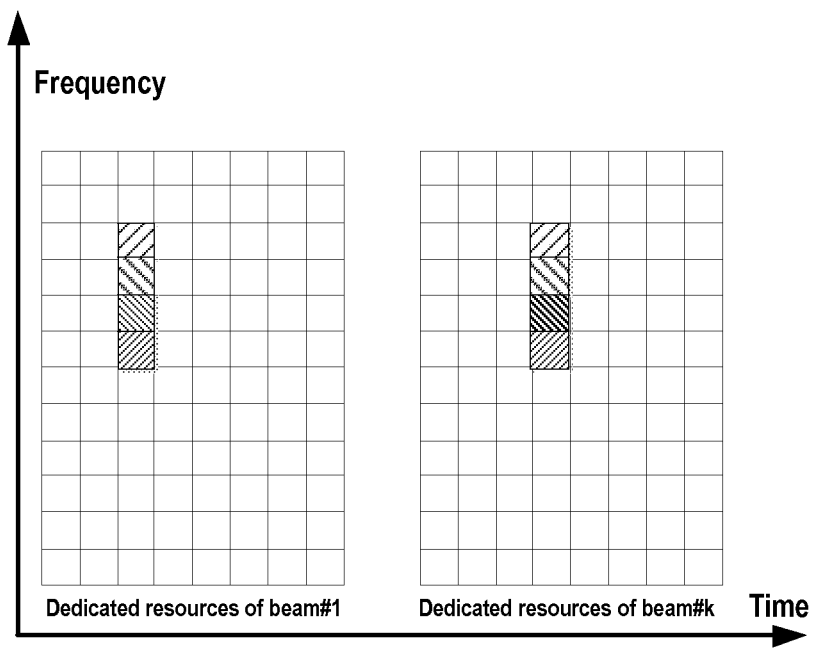
FIG. 5 is a schematic diagram of dedicated resource allocation according to a further embodiment of the present disclosure.

FIG. 5 shows a schematic diagram of dedicated resource allocation according to a further embodiment of the present disclosure. In this embodiment, the dedicated resources of respective beams are staggered in frequency domain. Similar to FIGS. 3 and 4, FIG. 5 only illustratively shows the dedicated resources of beam #1 and beam #k for clarity. Likewise, in FIG. 5, each block represents a unit of time-frequency resource, e.g., resource element (RE) and FIG. 5 illustratively allocates four resource elements (indicated by diagonal in FIG. 5) to each beam. However, it should be understood that any other number of resource elements are still possible. As shown in FIG. 5, the dedicated resources allocated to beam #1 and beam #k have different positions and are staggered in time domain.

In some embodiments, the network device 110 allocates (225) dedicated resources specific to the terminal device 120. In these embodiments, different dedicated resources are allocated to each UE to avoid collisions when UEs within one beam or UEs among a plurality of beams are contending dedicated resources. In these embodiments, implementation efficiency of the solution is improved without the contention among UEs.

Now continue to refer to FIG. 2, the network device 110 transmits (230) a first indication of the allocated dedicated resources to the UE 120. The network device 110 transmits related information to the UEs that apply for the UE-centric mobility management to inform the UEs of the dedicated resources required if they might transmit a beam switching request later. Here, by receiving (235) the first indication, the UE 120 will know the dedicated resources to be used upon transmitting a beam switching request.

In some embodiments, if the UE 120 fails to receive the first indication, the UE 120 can implement the traditional mobility management solution as an example, e.g., in some embodiments, the network device 110 can transmit (230) information of the dedicated resources corresponding to all beams to the UE 120. Alternatively, the network device 110 can also transmit (230) only information about the dedicated resources corresponding to the serving beams of the terminal device 120 and the neighboring beams to the terminal device.

Afterwards, the terminal device 120 determines (240) whether a beam switching is to be implemented. With reference to FIG. 1, the terminal device can move from a partition of a serving beam to a partition of a neighboring beam due to its high-speed operation, and the original transmission quality will dramatically degrade accordingly. In addition, each beam is quite narrow in the beam-based millimeter wave communication system, so it is possible to have static blockage or dynamic blockage. In this case, the original transmission quality will also dramatically degrade. Here, the terminal device 120 will autonomously determine whether a beam switching is to be implemented to ensure communication quality.

In some embodiments, if the terminal device 120 finds out that the transmission quality of one non-serving beam is better than that of the serving beam and a predetermined condition is satisfied, it triggers the beam switching procedures. For example, the terminal device 120 monitors transmission quality of a group of beams and the group of beams comprises a serving beam for the terminal device and at least one neighboring beam. If transmission quality of one of the at least one neighboring beam is higher than that of the serving beam within a second predetermined time period, the terminal device 120 determines the neighboring beam as a target beam and decides to implement the beam switching. For instance, with reference to FIG. 1, if the terminal device 120 finds out that the transmission quality of a serving beam #3 is continuously lower than that of a neighboring beam #4 during a given time period, the terminal device 120 will determine the neighboring beam #4 as a target beam and decides to implement the beam switching.

Alternatively or additionally, if dynamic blockage or static blockage occurs, the terminal device 120 can also determine a neighboring beam as the target beam and decide to implement the beam switching. For example, the neighboring beam can also be a neighboring beam with the optimal transmission quality with respect to the terminal device 120.

In response to determining that the beam switching is to be implemented, the terminal device 120 transmits (245) to the network device 110 a beam switching request over the dedicated resources to indicate a target beam to which the terminal device 120 is to be switched. In some embodiments, the terminal device 120 can select a sequence from a predetermined common sequence set, add scrambling codes to the sequence to attach information related to ID of the terminal device 120 and the target beam, and transmits (245) the scrambled sequence over the dedicated resources. The network device 110 will receive (250) and decode the sequence to determine the ID of the terminal device 120 and a target beam to which the terminal device 120 intends to switch. Here, as respective beams belong to the same millimeter wave cell and downlink channel synchronization and uplink synchronization among a plurality of beams are the same, there is no need to perform synchronization upon implementing the beam switching.

For the use of dedicated resources, a terminal device can transmit (245) a beam switching request in a non-contention manner and a contention manner. For example, in some embodiments, if the network device 110 allocates (225) dedicated resources specific to the terminal device 120, the terminal device 120 can transmit (245) a beam switching request in a non-contention manner. This solution improves system efficiency. Alternatively, if the network device 110 does not allocate dedicated resources specific to the terminal device 120, the terminal device 120 can transmit (245) a beam switching request in a contention manner. Such solution stands out mainly in low system load.

Figure 6:
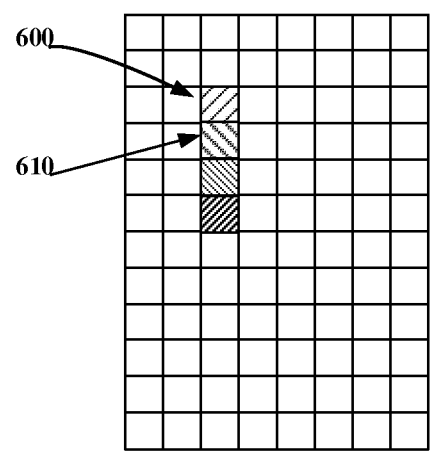
FIG. 6 is a schematic diagram of intra beam terminal device contention according to one embodiment of the present disclosure.

In some embodiments, the terminal device 120 transmits (245) a beam switching request to the network device 110 by contending dedicated resources of the serving beam with other terminal devices in the serving beam for the terminal device 120. Here, this situation is known as intra beam contention. Specifically, several terminal devices in the same beam can contend dedicated resources of the serving beam to transmit the beam switching request. FIG. 6 shows a schematic diagram of intra beam terminal device contention according to one embodiment of the present disclosure. As indicated in FIG. 6, four resource elements are illustratively allocated to one beam as dedicated resources 600 (represented by diagonal in FIG. 6). However, it should be understood that any other number of resource elements is also possible. Furthermore, FIG. 6 also shows dedicated resources 610 for which two terminal devices (e.g., UE1 and UE2) with the beam as a serving beam are contending. Therefore, the UE1 and UE2 are contending with each other for the dedicated resources in the serving beam.

Figure 7:
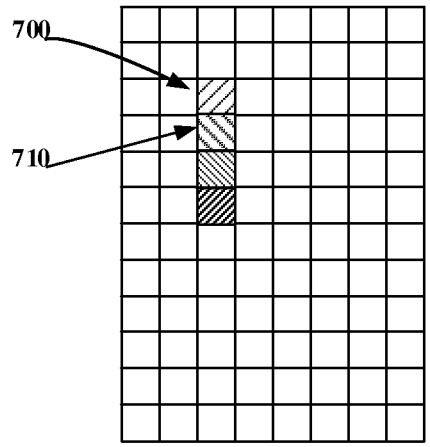
FIG. 7 is a schematic diagram of inter beam terminal device contention according to one embodiment of the present disclosure.

In some embodiments, the terminal device 120 transmits (245) a beam switching request to the network device 110 by contending dedicated resources of the target beam with other terminal devices in the target beam. Here, this situation is known as inter beam contention. For example, if the fast-moving terminal device 120 finds that the target beam quality is better than the serving beam, and the terminal device 120 has already known the dedicated resources of the target beam, the terminal device 120 may contend the dedicated resources of the target beam to inform the network device 110 to perform the beam switching. FIG. 7 shows a schematic diagram of inter beam terminal device contention according to one embodiment of the present disclosure. As indicated in FIG. 7, four resource elements are illustratively allocated to one beam as dedicated resource 700 (represented by diagonal in FIG. 7). However, it should be understood that any other number of resource elements is also possible. Furthermore, FIG. 7 also shows dedicated resource 710 for which two terminal devices (e.g., UE1 and UE2) are contending. Here, UE 1 currently regards beam #1 as a serving beam and beam #2 as a target beam while UE 2 regards beam #2 as a serving beam. Therefore, UE 1 is now contending dedicated resources of the target beam with UE 2 in the target beam (i.e., beam #2).

Now return to FIG. 2 and the network device 110 transmits (255) an acknowledge message (ACK) to the terminal device 120 in response to receiving (250) the beam switching request. Here, if the network device 110 successfully decodes the beam switching indication, the network device 110 needs to transmit (255) the acknowledge message to the requesting terminal device.

In some embodiments, the network device 110 transmits (255) an acknowledge message via at least one of the serving beam of terminal device 120 and the target beam. For example, in terms of intra beam contention, if one terminal device contends successfully, the network device transmits (255) an acknowledge message via a serving beam for the terminal device or via both the serving team and a target beam. For instance, in terms of inter beam contention, if one terminal device contends successfully, the network device transmits (255) an acknowledge message by a serving beam, or a target beam or both a serving team and a target beam.

Next, the terminal device 120 and the network device 110 communicate with each other through a target beam. Once receiving (260) the acknowledge message, the terminal device 120 will immediately switch to the target beam and start transmitting (265) and receiving (270) data. After switching to the target beam, the terminal device 120 will update the group of beams to be monitored and prepare the next beam switching.

Alternatively, if the terminal device 120 does not receive an acknowledge message from the network device 110 within a third period time, the terminal device 120 will determine at least one of contention cycle, contention strategy and contention abandonment. For example, the terminal device 120 can autonomously determine the next contention time and/or waiting time. Alternatively or additionally, the terminal device 120 can also autonomously increase transmission power to improve the success rate of next contention. Alternatively, the terminal device 120 can also abandon contention, i.e., give up using the terminal device-centric mobility management solution and resort to the traditional network device-centric mobility solution to complete the beam switching procedures.

ideas of the embodiments and several exemplary implementations of the present disclosure have been described with reference to the interaction shown in FIG. 2. Flow charts of communication methods implemented by the network device and terminal device respectively will be described with reference to FIGS. 8 and 9 below.

Figure 8:
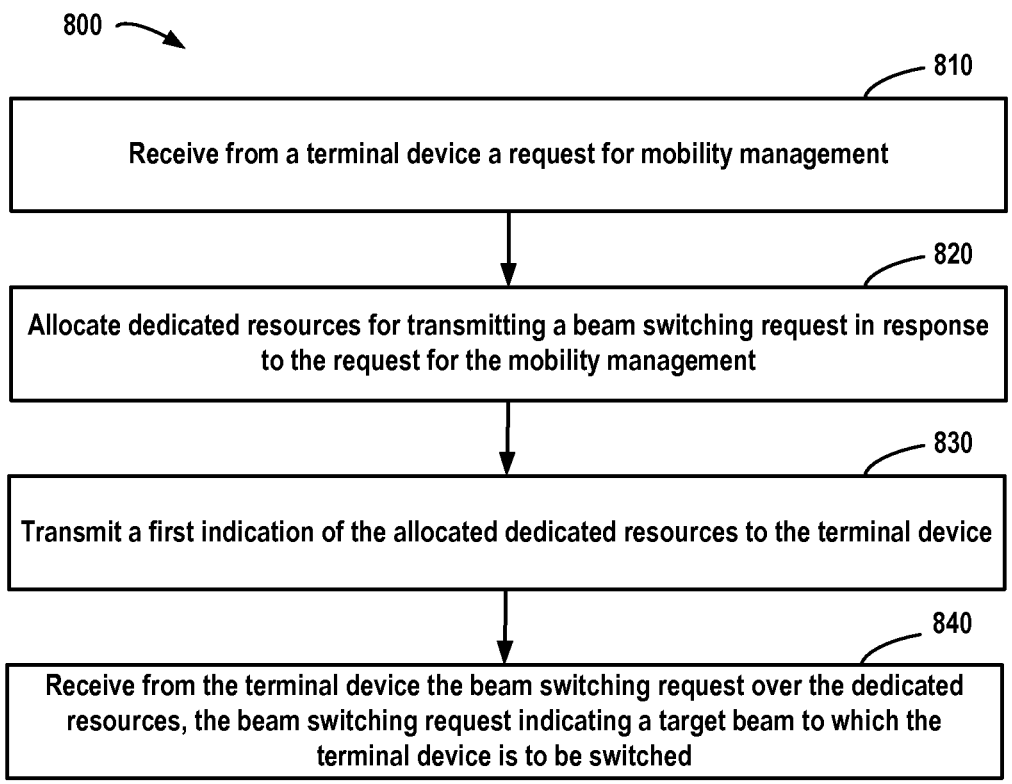
FIG. 8 is a flow chart of a method 800 for mobility management implemented by a network device in a beam-based millimeter wave communication system.

Specifically speaking, FIG. 8 shows a flow chart of a method 800 for mobility management implemented by an network device in a beam-based millimeter wave communication system and the method 800 can be performed by the network device 110 described above.

As shown in FIG. 8, at step 810, the network device receives a request for mobility management from the UE. At step 820, the network device allocates dedicated resources for transmitting a beam switching request in response to the request for the mobility management. At step 830, the network device transmits a first indication for the allocated dedicated resources to the UE. At step 840, the network device receives a beam switching request from the UE over the dedicated resources, the beam switching request indicating a target beam to which UE is to be switched.

Although FIG. 8 only shows several steps of method 800, it should be understood that the method 800 can also comprise several optional steps not shown. For example, in some embodiments, the method 800 further comprises broadcasting a second indication indicating whether the network device supports the mobility management. In some embodiments, a second indication is broadcasted in a master information block over a physical broadcast channel, the second indication occupying one bit in the master information block.

In some embodiments, the network device allocates dedicated resources based on the number of terminal devices that transmit requests for mobility management. For example, if the number of terminal devices that transmit the requests is below a predetermined threshold within a first predetermined time period, at least a part of time-frequency resources of special sub-frames are allocated as dedicated resources; and if the number of terminal devices that transmit the requests is above the predetermined threshold within the first predetermined time period, at least a part of time-frequency resources of normal sub-frames are allocated as dedicated resources.

In some embodiments, the network device allocates the same dedicated resources for all beams in the beam-based millimeter wave communication system. Alternatively, in some embodiments, the network device allocates different dedicated resources for respective beams in the beam-based millimeter wave communication system. For example, dedicated resources different in at least one of time domain and frequency domain are allocated to respective beams in the beam-based millimeter wave communication system. Alternatively or additionally, the network device allocates dedicated resources specific to the terminal device in some embodiments.

In some embodiments, the method 800 further comprises: the network device transmits an acknowledge message to the terminal device in response to a beam switching request, e.g., the network device transmits an acknowledge message to the terminal device via at least one of a serving beam for the terminal device and the target beam. In some embodiments, the method 800 further comprises: the network device communicates with the terminal device via the target beam.

Figure 9:
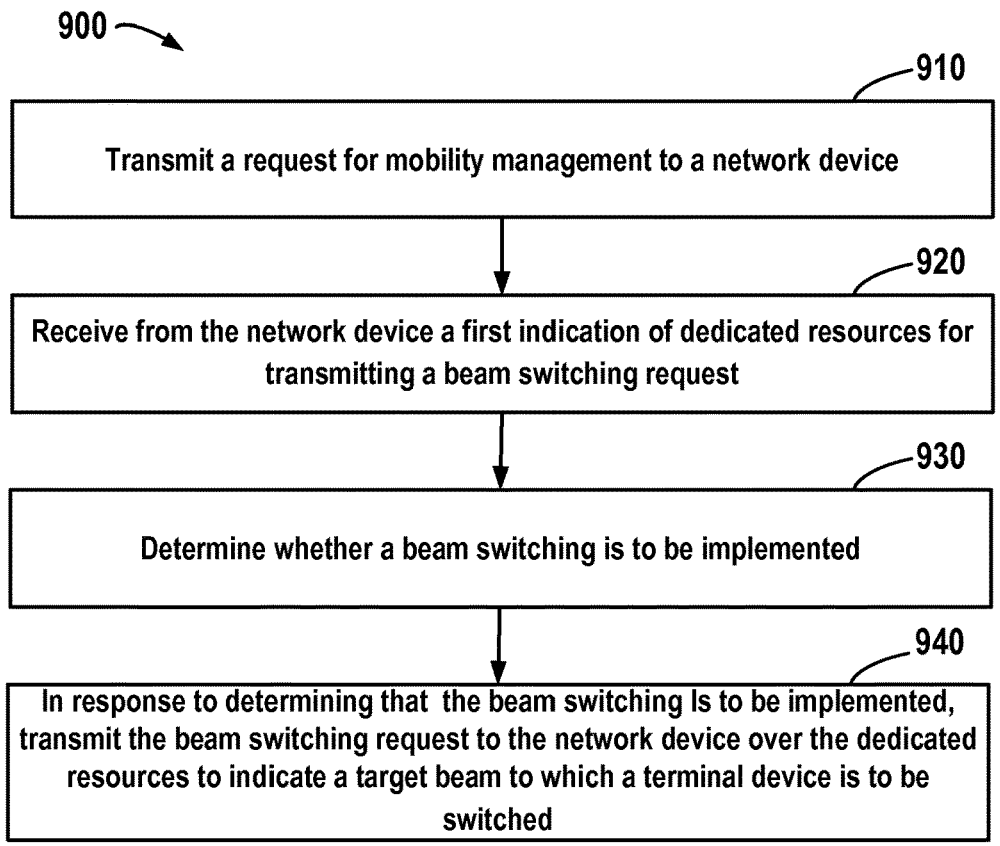
FIG. 9 is a flow chart of a method 900 for mobility management implemented by a terminal device in a beam-based millimeter wave communication system.

FIG. 9 shows a flow chart of a method 900 for mobility management implemented by a terminal device in a beam-based millimeter wave communication system. The method 900 can be performed by the terminal device 120 described above.

As shown in FIG. 9, at step 910, the terminal device transmits a request for mobility management to the network device. At step 920, the terminal device receives from the network device a first indication for dedicated resources for transmitting a beam switching request. At step 930, the terminal device determines whether a beam switching is to be implemented. At step 930, in response to determining that the beam switching is to be implemented, the terminal device transmits a beam switching request to the network device over dedicated resources to indicate a target beam to which the terminal device is to be switched.

Although FIG. 9 only illustrates several steps of the method 900, it should be understood that the method 900 can also comprise multiple optional steps not shown, e.g., in some embodiments, the method 900 can also comprise: the terminal device transmits the request for the mobility management to the network device when accessing to the network device.

In some embodiments, the method 900 further comprises: the terminal device monitors transmission quality of a group of beams, the group of beams including a serving beam for the terminal device and at least one neighboring beam. Besides, if transmission quality of one of the at least one neighboring beam is higher than that of the serving beam within a second predetermined time period, the terminal device determines the neighboring beam as a target beam and decides to implement the beam switching.

Alternatively or additionally, in some embodiments, if dynamic blockage or static blockage occurs, the terminal device determines a neighboring beam of the terminal device as the target beam and decides to implement the beam switching.

Additionally, in some embodiments, the method 900 also comprises: the terminal device receives, from the network device, a second indication indicating whether the network device supports the mobility management. In response to the second indication indicating that the network device supports the mobility management, the terminal device transmits a mobility management request to the network device.

In some embodiments, the method 900 further comprises: the terminal device transmits a beam switching request to the network device by contending dedicated resources of a serving beam for the terminal device with other terminal devices in the serving beam. Alternatively, the method 900 also comprises: the terminal device transmits a beam switching request to the network device by contending dedicated resources of the target beam with other terminal devices in the target beam.

In some embodiments, the method 900 also comprises: the terminal device receives an acknowledge message from the network device, and in response to the acknowledge message, switches to the target beam and communicates with the network device via the target beam. In some embodiments, the method 900 further comprises: in response to not receiving an acknowledge message from the network device within a third predetermined time period, the terminal device determines at least one of contention cycle, contention strategy and contention abandonment. In some embodiments, the method 900 comprises: the terminal device receives an acknowledge message from the network device via at least one of a serving beam for the terminal device and the target beam.

Figure 10:
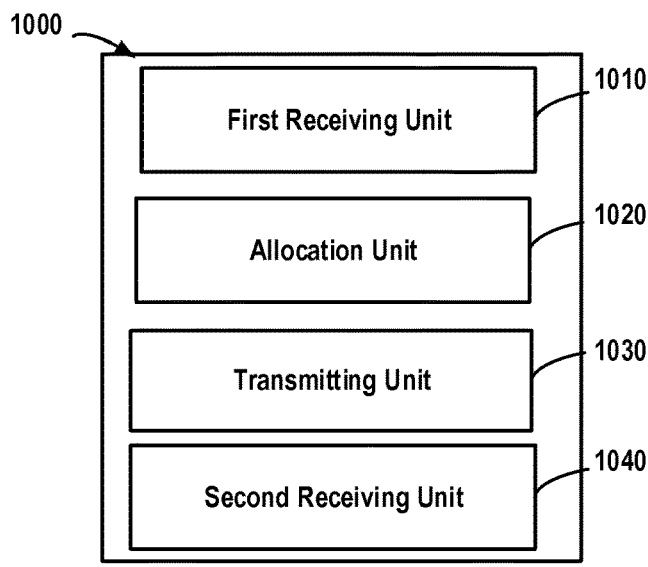
FIG. 10 is a block diagram of an apparatus 1000 for mobility management in a beam-based millimeter wave communication system according to embodiments of the present disclosure.

FIG. 10 shows a block diagram of an apparatus 1000 for mobility management in a beam-based millimeter wave communication system according to embodiments of the present disclosure. For example, the apparatus 1000 can be implemented in an network device of the communication system or by the network device. For instance, the apparatus 1000 can be implemented in the network device 110 of FIGS. 1 and 2.

As shown in FIG. 10, the apparatus 1000 comprise a first receiving unit 1010 configured to receive a request for mobility management from a terminal device and also comprises an allocation unit 1020 configured to allocate dedicated resources for transmitting a beam switching request in response to the request for the mobility management. The apparatus 1000 further comprises a transmitting unit 1030 configured to transmit a first indication for the allocated dedicated resources to the terminal device, and a second receiving unit 1040 configured to receive a beam switching request from the terminal device over the dedicated resources, the beam switching request indicating a target beam to which the terminal device is to be switched.

In some embodiments, the apparatus 1000 also comprises a broadcasting unit 1050 configured to broadcast a second indication indicating whether the network device supports the mobility management. In some embodiments, the broadcasting unit 1050 is also configured to broadcast a second indication in a master information block over a physical broadcast channel, the second indication occupying one bit in the master information block.

In some embodiments, the allocation unit 1020 is further configured to allocate dedicated resources according to the number of terminal devices that transmit requests for mobility management.

In some embodiments, the allocation unit 1020 is further configured to allocate at least a part of time-frequency resources of pecial sub-frames as dedicated resources if the number of terminal devices that transmit the requests is below a predetermined threshold within a first predetermined time period; and allocate at least a part of time-frequency resources of a normal sub-frames as dedicated resources if the number of terminal devices that transmit the requests is above the predetermined threshold within the first predetermined time period.

In some embodiments, the allocation unit 1020 is further configured to allocate same dedicated resources to all beams in a beam-based millimeter wave communication system.

In some embodiments, the allocation unit 1020 is further configured to allocate different dedicated resources to respective beams in a beam-based millimeter wave communication system.

In some embodiments, the allocation unit 1020 is further configured to allocate dedicated resources different in at least one of a time domain and a frequency domain to respective beams in the beam-based millimeter wave communication system.

In some embodiments, the allocation unit 1020 is further configured to allocate dedicated resources specific to the terminal device.

In some embodiments, the transmitting unit 1030 is further configured to transmit an acknowledge message to the terminal device in response to a beam switching request.

In some embodiments, the transmitting unit 1030 is further configured to transmit an acknowledge message to the terminal device via at least one of a serving beam for the terminal device and the target beam.

In some embodiments, the apparatus 1000 also comprises a communication unit 1060 configured to communicate with the terminal device via the target beam.

Figure 11:
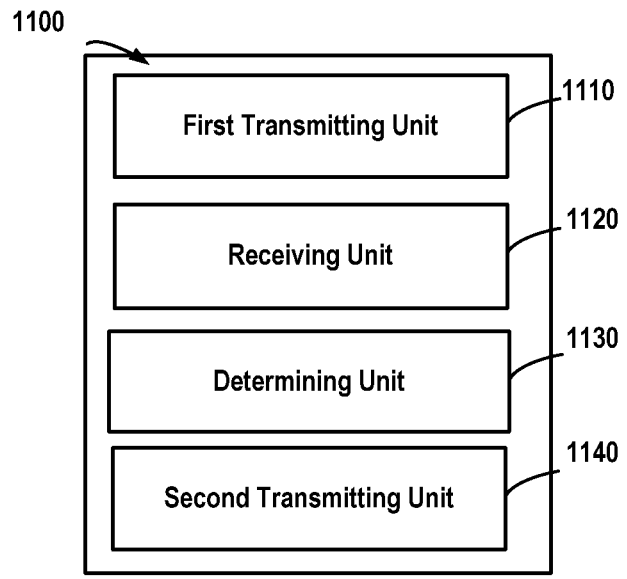
FIG. 11 is a block diagram of an apparatus 1100 for mobility management in a beam-based millimeter wave communication system according to embodiments of the present disclosure.

FIG. 11 shows a block diagram of an apparatus 1100 for mobility management in a beam-based millimeter wave communication system according to embodiments of the present disclosure. The apparatus 1100 can be implemented in a terminal device of the communication system or by the terminal device as an example. For instance, the apparatus 1100 can be implemented in the terminal device 120 of FIGS. 1 and 2.

As shown in FIG. 11, the apparatus 1100 can comprise a first transmitting unit 1110 configured to transmit a request for mobility management to an network device. The apparatus 1100 can also comprise a receiving unit configured to receive a first indication for dedicated resources for transmitting a beam switching request from the network device. The apparatus can also comprises a determining unit 1130 configured to determine whether a beam switching is to be implemented and a second transmitting unit 1140 configured to transmit the beam switching request to the network device over the dedicated resources to indicate a target beam to which the terminal device is to be switched in response to determining that the beam switching is to be implemented.

In some embodiments, the apparatus 1100 can also comprise a monitoring unit 1150 configured to monitor transmission quality of a group of beams, the group of beams including a serving beam for the terminal device and at least one neighboring beam. The determining unit 1130 is also configured to: if transmission quality of one of the at least one neighboring beam is higher than that of the serving beam within a second predetermined time period, determine the neighboring beam as a target beam and decide to implement the beam switching.

In some embodiments, the determining unit 1130 is also configured to determine a neighboring beam of terminal devices as the target beam and decide to implement the beam switching if dynamic blockage or static blockage occurs.

In some embodiments, the receiving unit 1120 is also configured to receive, from an network device, a second indication indicating whether the network device supports the mobility management and the first transmitting unit 1110 is also configured to transmit a mobility management request to the network device in response to the second indication indicating that the network device supports the mobility management.

In some embodiments, the second transmitting unit 1140 is further configured to transmit a beam switching request to the network device by contending the dedicated resources of the serving beam for the terminal device with other terminal devices in the serving beam.

In some embodiments, the second transmitting unit 1140 is also configured to transmit a beam switching request to the network device by contending dedicated resources of the target beam with other terminal devices in the target beam.

In some embodiments, the receiving unit 1120 is also configured to receive an acknowledge message from the network device. In some embodiments, the apparatus 1100 also comprises a communication unit 1160 configured to switch to a target beam and communicate with the network device via the target beam in response to the acknowledge message.

In some embodiments, the determining unit 1130 is further configured to determine at least one of contention cycle, contention strategy and contention abandonment in response to not receiving an acknowledge message from the network device within a third predetermined time period.

In some embodiments, the receiving unit 1120 is configured to receive an acknowledge message from the network device via at least one of the serving beam of the terminal device and the target beam.

In some embodiments, the first transmitting unit 1110 is configured to transmit the request for the mobility management to the network device upon accessing to the network device.

It should be understood that the apparatuses 1000 and 1100 shown in FIGS. 10 and 11 each can be implemented partially or fully by a software module, a hardware module, a firmware module or any other combinations thereof and the scope of the present disclosure is not limited in this regard. For example, in a hardware-based implementation, one or more units described above can be implemented by hardware devices, such as integrated circuit (IC), application-specific integrated circuit (ASIC), system-on-chip (SOC) and field programmable gate array (FPGA).

Figure 12:
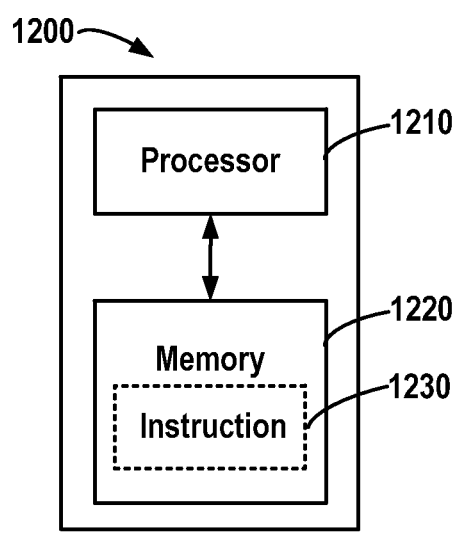
FIG. 12 shows a block diagram of a device 1200 suitable for implementing embodiments of the present disclosure.

FIG. 12 shows a block diagram of a device 1200 suitable for implementing embodiments of the present disclosure. The device 1200 can be used to implement an network device and/or a terminal device according to the present disclosure, e.g., the network device 110 and/or the terminal device 120.

As shown in FIG. 12, the device 1200 comprises a processor 1210 and a memory 1220 coupled to the processor 1210, the memory 1220 being stored with instructions 1230 operated by the processor 1210. The memory 1220 can be any appropriate types suitable for local technology environment and can be implemented by any suitable data storage technology, including but not limited to storage device, magnetic storage device and system, and optical storage device and system of the semiconductor. Although FIG. 12 only illustrates one memory unit, the device 1200 can comprise a plurality of memory units different on physical level.

The processor 1210 can be any appropriate types suitable for the local technology environment and comprise but not limited to general computer, special-purpose computer, microprocessor, digital signal processor (DSP) and one or more of the processor-based multicore processor architectures. The device 1200 can also comprise a plurality of processors 1210 configured to execute the method according to the first aspect or the second aspect of the present disclosure, i.e., the method implemented on the network device side or on the terminal device side shown in FIG. 2.

The present disclosure proposes a method and an apparatus for mobility management in a beam-based millimeter communication system. The proposed solution has at least following merits: 1) fast beam switching because the waiting time for a terminal device-centric decision is shorter before beam switching; 2) robustness of beam switching because the solution can solve dynamic and static blockage in a better way; 3) low system load since only one bit and dynamic dedicated system resources are required for supporting fast beam switching; 4) good backward compatibility, which can effectively and simultaneously support mobility management for fast moving terminal devices and semi-static/static terminal devices.

In one or more exemplary designs, hardware, software, firmware or any random combinations thereof can implement functions of the present application. If software is used for implementation, the functions will be stored on the computer-readable medium as one or more instructions or codes or transmitted as one or more instructions or codes on the computer-readable medium. The computer-readable medium comprises computer storage medium and communication medium, wherein the communication medium includes any medium facilitating to transfer the computer program from one place to another and the storage medium can be any available medium accessed by general or special-purpose computer. The computer-readable medium can comprise but not limited to RAM, ROM, EEPROM, CD-ROMD or other optical storage devices, disk storage devices or other magnetic storage devices, or any other medium used for carrying or storing desired program code modules by instructions or data structures accessible by general or special-purpose computers or general or special-purpose processors. Besides, random connection can also be regarded as computer-readable medium. For instance, if the software is transmitted from websites, servers or other remote sources using coaxial-cable, optical fiber and cable, twisted pair, digital subscriber line (DSL) or wireless technology, such as infrared rays, radio and microwave, the coaxial-cable, optical fiber and cable, twisted pair, digital subscriber line (DSL) or wireless technology, such as infrared rays, radio and microwave are included in the definition of medium.

Universal processor, digital signal processor (DSP), application-specific integrated circuit (ASIC), field programmable gate array (FPGA) or other programmable logic devices, discrete gate or transistor logic, discrete hardware components or any combinations of functions for implementing the present disclosure are used to implement or execute various exemplary logic blocks, modules or circuits as described with reference to the present disclosure. The universal processor can be a microprocessor, or any other normal processor, controller, microcontroller or state machine. The processor can be implemented as a combination of computing devices, e.g., a combination of DSP and microprocessors, a plurality of microprocessors, a combination of one or more microprocessors and DSP core, or any other structure of this kind.

The ordinary skilled in the art should also understand that various exemplary logic blocks, modules, circuits and algorithm steps described with reference to the embodiments of the present disclosure can be implemented as electronic hardware, computer software or a combination of the above two. To clearly indicate the interchangeability between hardware and software, the above text provides a general description about the functions of the various exemplary components, blocks, modules, circuits and steps. As to whether the function is implemented as hardware or software, it depends on specific applications and design constraints put on the entire system. Those skilled in the art can flexibly implement the described functions regarding each specific application. However, such implementation decision should not be interpreted as deviating from the protection scope of the present disclosure.

The above description of the present disclosure allows those ordinary skilled in the art to implement or use the present disclosure. For those ordinary skilled in the art, each modifications of the present disclosure are obvious and the general principles defined in the text can also be applied to other transformations without deviating from the spirit and protections scope of the present disclosure. Therefore, the present disclosure is not limited to embodiments and design of the text, but consistent with the broadest scope of the principle and novelty features of the present disclosure.

I claim:

1. A method for mobility management, implemented by a network device in a beam-based millimeter wave communication system, the method comprising:
    receiving, from a terminal device, a request for the mobility management;
    allocating dedicated resources for transmitting a beam switching request in response to the request for the mobility management;
    transmitting a first indication of the allocated dedicated resources to the terminal device; and
    receiving, from the terminal device, the beam switching request over the dedicated resources, the beam switching request indicating a target beam to which the terminal device is to be switched.

2. The method of claim 1, further comprising:
    broadcasting a second indication that indicates whether the network device supports the mobility management.

3. The method of claim 1, wherein allocating the dedicated resources comprises:
    allocating the dedicated resources based on the number of terminal devices that transmit requests for mobility management.

4. The method of claim 1, wherein allocating the dedicated resources comprises:
    allocating the same dedicated resources to all beams in the beam-based millimeter wave communication system.

5. The method of claim 1, wherein allocating the dedicated resources comprises:
    allocating different dedicated resources to respective beams in the beam-based millimeter wave communication system.

6. The method of claim 1, wherein allocating the dedicated resources comprises:
    allocating dedicated resources specific to the terminal device.

7. The method of claim 1, further comprising:
    transmitting an acknowledge message to the terminal device in response to the beam switching request.

8. A network device, comprising:
    a processor; and
    a memory including instructions executable by the processor, the processor being configured to cause the network device to:
    receive, from the terminal device, a request for mobility management;
    allocate dedicated resources for transmitting a beam switching request in response to the request for mobility management;
    transmit a first indication of the allocated dedicated resources to the terminal device; and,
    receive, from the terminal device, the beam switching request over the dedicated resources, the beam switching request indicating a target beam to which the terminal device is to be switched.

9. A method for mobility management, implemented by a terminal device in a beam-based millimeter wave communication system, the method comprising:
    transmitting a request for the mobility management to a network device;
    receiving, from the network device, a first indication of dedicated resources for transmitting a beam switching request;
    determining whether a beam switching is to be implemented; and
    in response to determining that the beam switching is to be implemented, transmitting the beam switching request to the network device over the dedicated resources to indicate a target beam to which the terminal device is to be switched.

10. The method of claim 9, further comprising:
    monitoring transmission qualities of a group of beams, the group of beams including a serving beam of the terminal device and at least one neighboring beam; and
    determining whether the beam switching is to be implemented comprises:
        if a transmission quality of one of the at least one neighboring beam is higher than that of the serving beam within a second predetermined time period, determining the one of the at least one neighboring beam as the target beam, and
        determining that the beam switching is to be implemented.

11. The method of claim 9, further comprising:
    receiving, from the network device, a second indication that indicates whether the network device supports the mobility management; and wherein transmitting the request for the mobility management to the network device comprises:
  transmitting the request for the mobility management to the network device in response to the second indication indicating that the network device supports the mobility management.

12. The method of claim 9, wherein transmitting the beam switching request to the network device on the dedicated resources comprises:
  transmitting the beam switching request to the network device by contending dedicated resources of a serving beam of the terminal device with other terminal devices in the serving beam.

13. The method of claim 9, wherein transmitting the beam switching request to the network device on the dedicated resources comprises:
  transmitting the beam switching request to the network device by contending dedicated resources of the target beam with other terminal devices in the target beam.

14. The method of claim 9, wherein transmitting the request for the mobility management to the network device comprises:
  transmitting the request for the mobility management to the network device upon accessing to the network device.

15. A terminal device, comprising:
a processor; and
a memory including instructions executable by the processor, the processor being configured to cause the terminal device to:
transmit a request for mobility management towards a network device;
receive, from the network device, a first indication of dedicated resources for transmitting a beam switching request;
determine whether a beam switching is to be implemented; and
in response to determining that the beam switching is to be implemented, transmit the beam switching request toward the network device over the dedicated resources to indicate a target beam to which the terminal device is to be switched.

* * * * *